United States Patent Office 3,256,249
Patented June 14, 1966

3,256,249
PHOSPHORAMIDATE BASED POLYURETHANES
Herwart C. Vogt, Grosse Ile, and John T. Patton, Jr., Wyandotte, Mich., assignors to Wyandotte Chemicals Corporation, Wyandotte, Mich., a corporation of Michigan
No Drawing. Filed Nov. 21, 1963, Ser. No. 325,486
8 Claims. (Cl. 260—77.5)

This invention relates to certain phosphoramidates and to polymers prepared therefrom. More particularly, the invention relates to phosphoramidate polyols containing at least one, and preferably two or more hydroxyl groups, which polyols may be reacted alone or in the presence of other polyols with organic polyisocyanates to obtain polyurethane resins having enhanced flame resistant properties.

The reaction of an organic diisocyanate with an organic compound containing at least two hydroxyl groups to produce polyurethane resins is well known. A relatively new and expanding use for polyurethane foams is in the building and insulation fields. In many of these applications, it is desirable, and in some instances necessary, that the foam be non-burning or flame retardant.

To enhance flame retardancy, various organic and inorganic materials, and more particularly halogen, nitrogen and phosphorus-containing compounds, have previously been added to the reaction mass during the polyurethane forming reaction. Thus, additives such as trichloroethyl phosphate, dialkyl phenyl phosphonate, ammonium phosphate, etc., have been utilized as physically bonded flame retardant agents. However, this expedient has never proven to be wholly acceptable for several reasons. Oftentimes such additives are not compatible with the foaming ingredients and/or the finished foam. These flame retardant agents may have a plasticizing action and tend to degrade foam properties. Still another disadvantage is that since these additives are only loosely physically bonded to the foam, they are subject to bleeding and migration, leading to a non-homogeneous composition. Moreover, many of the solid inorganic additives tend to settle out of solution and also may be abrasive to pumps and the metering system during foam preparation. Also, such additives are deleterious in that they tend to embrittle the finished foam. Another disadvantage with these prior art systems is that an inordinate amount of additives is required to realize any significant degree of flame retardancy.

It is an object of this invention to provide polyfunctional phosphoramidates. Another object is to provide polyurethane resins containing chemically bonded phosphoramides, which resins have a high degree of fire retardancy. Another object is to provide economical methods of obtaining fire retardant polyurethane foams, especially of the rigid type.

The polyhydroxy phosphoramidates provided by this invention may be broadly represented by Formula I:

(I) 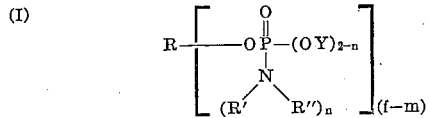

where R, together with attached oxygen is the residue of a polyol selected from the group consisting of organic polyols containing at least 2, preferably 3 to about 8 hydroxyl groups per molecule, and polyethers of said organic polyols; R' and R'' may be the same or different and represent a hydrocarbon group such as alkyl, aryl, cycloalkyl, alkaryl, aralkyl containing up to about 12, preferably up to 8, carbon atoms and the foregoing hydrocarbons substituted with one or more halogen atoms, preferably chlorine or bromine; $n$ is a number from 1 to 2, $m$ is a number from 0 to about 7, and is equal to the number of hydroxyl groups present in polyol residue R, $f$ is an integer greater than 1 and is equal to the number of hydroxyl groups originally present in said polyol; $(f-m)$ is equal to at least 1; Y is selected from the group consisting of R containing $(f-1)$ hydroxyl groups, and (II) 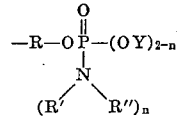

where R, R', R'', Y, $f$ and $n$ have the same significance as stated above and R contains $(f-2)$ hydroxyl groups, and wherein the molecule contains at least one and preferably two or more hydroxyl groups.

The hydroxyl-containing phosphoramidates of this invention are obtained by reaction of amidophosphorochloridates with an appropriate polyol containing 2 to 8 hydroxyl groups. The reaction is carried out in the presence of a hydrogen chloride acceptor, at temperatures ranging from about 0–100° C. and above, and preferably at 60–90° C. The reaction is conveniently conducted at atmospheric pressure. Suitable hydrogen chloride acceptors include tertiary amines, such as trialkyl amines, pyridine, alkali metal carbonates, etc. The amines are preferred for they also serve to act as a solvent for the system and give a coarser salt which can be easily removed by filtration.

The amidophosphorochloridates used to prepare the compounds of this invention are known materials and methods for their preparation are well established. Generally, they are prepared by reaction of a phosphorus halide such as phosphoryl oxychloride with a secondary amine. See for example Organophosphorus Compounds, John Wiley & Sons, Inc., New York, Chapter 10, and U.S. 2,752,392. The amidophosphorochloridates may be represented by Formula III:

(III) 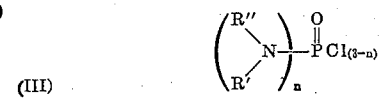

wherein $n$ is equal to 1 or 2 and R' and R'' have the same meaning as stated above.

The polyols that are employed in the reaction with the amidophosphorochloridates to obtain the phosphoramidates of this invention contain at least 2 and preferably 3 hydroxyl groups. Typical of these materials are the glycols, such as ethylene glycol, propylene glycol, trimethylene glycol, hexamethylene glycol, etc., glycerol, trimethylolethane, trimethylolpropane, pentaerythritol, dipentaerythritol, tripentaerythritol, sorbitol, manitol, sucrose, fructose, dextrose, α-methyl glycoside, etc. and alkylene oxide adducts of the foregoing.

From the foregoing, it is evident the preferred polyols employed include polyhydroxyalkanes containing 3 to 8 hydroxyl groups per molecule, saccharides such as mono- and disaccharides containing from 5 to 8 hydroxyl groups per molecule, and mono- and polyethers of the foregoing.

The preferred polyols are polyethers obtained by reacting any of the foregoing polyhydroxyl materials with an alkylene oxide such as ethylene oxide, propylene oxide, butylene oxide, epichlorohydrin, 1,1,1-trichloropropylene oxide, etc., or mixtures thereof. The reaction to prepare the polyethers is carried out in the presence of a conventional oxyalkylation catalyst such as BF₃, amines, alkali metal hydroxides and alcoholates, etc., preferably sodium or potassium hydroxide. The oxirane ring of the alkylene oxide is opened and reacts with a hydroxyl group of the polyhydroxyl compound to generate an ether linkage and a hydroxyl group. The reaction employing ethylene oxide as an example is as follows:

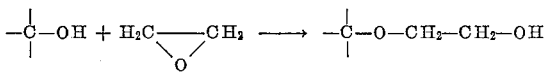

The hydroxyl group of the product may further react with additional alkylene oxide to generate another ether linkage and the formation of a new hydroxyl group. The procedure may be repeated to obtain polyethers ranging in molecular weight from about 200 to 7000, preferably from about 300 to 5000. Many of these polyether polyols are available under the trade name Pluracol polyols from Wyandotte Chemicals Corporation.

The reaction of a polyol, for example glycerol, with a phosphorodichloridate to produce the compounds of this invention may be represented by the following equations:

(IV)

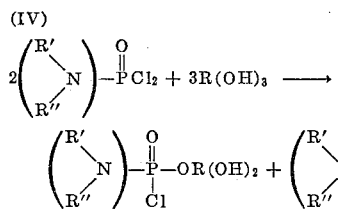

The products may further react with each other or with fresh reactants to produce a phosphoramidate having the following structure:

(V)

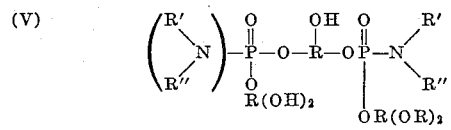

Any of the hydroxyl groups of this material my further react with additional phosphorochloridate to further increase the size of the phosphoamidate molecule to yield product mixtures encompassed by Formula I.

It is also possible that if a polyol having vicinal hydroxyl groups is reacted with the phosphorodichloridate, in addition to obtaining a linear product as depicted above cyclization may occur to yield a cyclic compound as follows:

(VI)

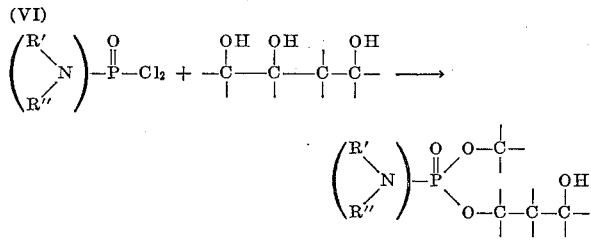

In the foregoing Formulae IV–VI, R, R' and R'' have the same significance as previously stated.

It is obvious from the foregoing that various reactions can occur, yielding a mixture of complex products. Normally the product can be represented by Formula I above wherein the composition has an average molecular weight of from about 300 to 10,000 or more.

The preferred phosphoramidates provided by this invention are obtained by reaction of bis(amido)phosphorochloridates with a polyol having at least 3 hydroxyl groups:

(VII)

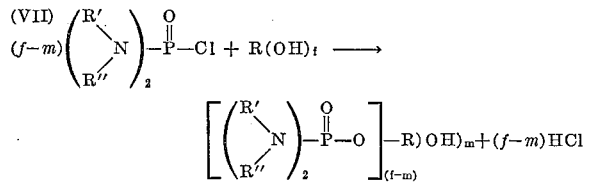

In the above formulae, R, R', and R'' have the same significance as stated above, $f$ is a number from 3 to 8, $m$ is a number from 2 to 7. Preferably, $(f-m)$ is 1 or 2, R is the residue of a polyether polyol as previously described, and R' and R'' are the same and are alkyl groups containing 1–8 carbon atoms.

As shown by the foregoing structure, the preferred phosphoramidates of the invention comprise a polyol nucleus containing at least 2 hydroxyl groups, preferably a polyether polyol nucleus, substituted with at least one phosphoramidate radical. The ratio of reactants will determine the degree of substitution on the polyol nucleus.

Any of the foregoing phosphoramidates and mixtures thereof with conventional polyether polyols or polyester polyols may be reacted with a suitable organic isocyanate to provide the polyurethane resins of this invention. The hydroxyl groups of the phosphoramidates react with —NCO groups and thus urethane resins containing chemically bonded phosphorus and nitrogen atoms are obtained.

In order to propagate chain growth, the phosphoramidate must contain at least 2 hydroxyl groups. Thus, the reaction product of a phosphorochloridate with a diol to yield a monohydroxy-containing compound can be used in minor proportions to control molecule size and to serve as a chemically bonded flame retardant agent. The reaction product of a triol with a phosphorodichloridate yields a product containing 2 hydroxyl groups and thereby enters the polymerization reaction.

Any suitable organic polyisocyanate may be used to react with the phosphoramidates of this invention to produce polyurethane resins. The isocyanates include, for example, tetramethylene diisocyanate, hexamethylene diisocyanate, the α,α-xylene diisocyanates, cyclohexane-1,4-diisocyanate, phenylene diisocyanate, chlorophenylene diisocyanate, tolylene diisocyanate, 1-alkylbenzene-2,6-diisocyanate, 2,6-diethylbenzene-1,4-diisocyanate, diphenylmethane-4,4'-diisocyanate, polymethylene polyphenyl isocyanate, 3,3' - dimethoxydiphenylmethane - 4,4' - diisocyanate, and the like.

In many instances, foams with optimum properties are obtained by reacting a polyisocyanate with a mixture comprising a phosphoramidate polyol of this invention and one or more conventional polyether polyols or polyester polyols. Usable polyesters are those obtained by condensing a polybasic, usually dibasic, organic acid such as adipic, sebacic, phthalic, terephthalic, oxalic, malonic, succinic, etc. with a polyalcohol such as a glycol including ethylene glycol, propylene glycol, diethylene glycol, dipropylene gloycol, polypropylene glycol, or with a polyol such as glycerol, sorbitol, pentaerythritol, etc. Preferably, the polyester polyol should have a molecular weight of about 250 to 7000. The acid number should be below about 15. The polyesters are prepared by any of the conventional techniques such as reaction at elevated temperatures in the presence of an acid catalyst.

The polyol mixture to be reacted with the diisocyanate may also include one or more conventional polyether polyols. These materials are prepared by condensing an organic polyol containing 2 to 8 carbon atoms such as the glycols, glycerol, trimethylolpropane, pentaerythritol, sorbital, sucrose, dipentaerythritol, α-methyl glucoside, etc., with an alkylene oxide having from about 2 to 4 carbon atoms such as ethylene oxide, propylene oxide, butylene oxide, epichlorohydrin, or mixtures of any or all of these oxides. The reaction is usually carried out in the presence of an alkaline or acidic catalysts such as $BF_3$ etherate or sodium or potassium hydroxide. These products contain at least one ether linkage and one hydroxyl group for every hydroxyl group in the parent polyol. These polyethers preferably have a molecular weight from about 200 to 7000.

The amount of conventional polyether or polyester polyols that may be utilized with the phosphoramidate polyols depends upon the degree of the flame retardancy desired in the polyurethane foam. The exclusive use of a phosphoramidate polyol of this invention as the polyol in the urethane forming reaction can provide a non-burning foam. Inclusion of a conventional polyether or polyester polyol dilutes the effectiveness of the phosphoramidate in accordance with the amount of conventional polyol added. As increasing amounts of conventional polyether or polyester polyols are included with the phosphoramidate, the properties of resulting polyurethane foam change from a nonburning state to a self-extinguishing, and, finally, as 100% conventional polyol is approached the foam completely burns. Oftentimes as much as 90 to over 95% of a conventional polyol may be included with the phosphoramidate of this invention to provide foams that have adequate fire retardancy properties.

The reaction of a polyol with a polyisocyanate to produce a polyurethane foam may yield a flexible or rigid product, depending upon the degree of cross-linking, i.e. the type polyol and isocyanate used. Since the phosphoramidates of this invention may be admixed with a relatively large proportion of other polyols to be reacted with an isocyanate having 2 or more —NCO groups, either rigid or flexible foams may be obtained. Thus, while the remainder of the specification is primarily concerned with the production of flame retardant rigid polyurethane foams, it will be understood that flexible foams are also within the purview of the invention. Also, polyurethanes of this invention are usable in flame lamination applications. In such use, sufficient fire retardancy is required to allow the urethane to tolerate a flame for a short period as it is laminated to a substrate.

The foam forming reaction between the polyol and isocyanate is usually carried out in the presence of water which reacts with —NCO groups to release $CO_2$ and causes expansion of the mass to form the foam. In addition to, or in place of, the water, inert halohydrocarbon gases such as trichlorofluoromethane may be employed to cause the foaming. Other ingredients used in the foaming reaction include surfactants, such as silicone polymers, to provide a homogeneous mass; catalysts such as stannous octoate and amines such as triethylene diamine to improve reaction rate; cross-linking agents, such as N,N,N',N'-tetrakis(2-hydroxypropyl)ethylene diamine, to increase the rigidity and strength of the foam, etc.

The foam may be prepared according to the "one-shot" technique, i.e. all the reactants are mixed at one time, or an intermediate or a "prepolymer" may be formed. With the latter technique, excess isocyanate is reacted with the polyol to form an isocyanate-terminated intermediate which is reacted with additional polyol at any later time.

It is usually desirable to react the polyol and isocyanate in proportions to have an —NCO/OH ratio of approximately 1:1. In practice, a ratio of about 1.05:1 is used to insure complete reaction of all terminal hydroxyl groups.

Methods of preparing the novel phosphoramidates of this invention, and polyurethanes made therefrom, are illustrated by the following examples wherein, unless stated otherwise, all compositions specified are in terms of weight percent.

*Example I*

To a 2-liter flask equipped with a stirrer, dropping funnel and condenser was added 171 grams of bis(dimethylamido)phosphorochloridate, 131 grams of triethylamine and 165 grams of triethylene glycol. The mixture was heated to about 55° wherein some precipitate formed and the reaction mixture became slightly darker. Nitrogen was bubbled through the system and the reaction mass was heated at 55–80° for a period of about 6½ hours. Three hours after the initial heating, an additional 71 grams of triethylamine was added to the reaction mass. At the completion of the reaction, the precipitated triethylamine hydrochloride was filtered, leaving 749 grams of a dark brown liquid. This material was stripped at 35° C., at 1–2 mm. Hg pressure. 311 grams of the desired product was obtained. An infrared spectrum on this material was in complete agreement with the structure:

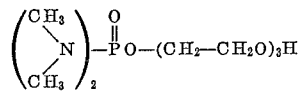

This material is monofunctional, i.e. it has one hydroxyl group, and thus may be included in the urethane forming reaction to provide a chemically bound flame retarding agent.

*Example II*

To a reaction flask, as in Example I, are charged 682 grams of bis(dimethylamido)phosphorochloridate, 1060 grams of Pluracol SP–560 Polyol, 630 grams of triethylamine and 31 grams of activated carbon bone black. Pluracol SP–560 is a polyether polyol obtained by condensing sorbitol and propylene oxide to yield a product having 6 hydroxyl groups, a molecular weight of about 514, a hydroxyl number of about 654 and an acid number below 1. It is available commercially from Wyandotte Chemicals Corporation. Nitrogen was bubbled through the system and the mixture was heated at 80–100° for about 6½ hours. An additional 179 grams of triethylamine was charged, and the reaction mass was heated at 66–78° for an additional 4½ hours. The solution was then filtered through a Buchner funnel having a diatomaceous earth bed and the filtrate stripped at 70° C., 2 mm. Hg pressure. Aftr refiltering, 850 grams of a product was obtained, the major portion of which corresponded to the formula:

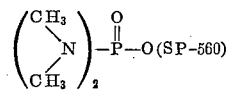

wherein (SP–560) contains five hydroxyl groups and together with attached oxygen is the residue of Pluracol SP–560 polyether described above.

*Example III*

1632 grams of Pluracol PeP–450 Tetrol, 682 grams of bis(dimethylamido)phosphorochloridate, 43 grams of activated carbon, and 510 grams of triethylamine were charged to a reaction flask. Pluracol PeP–450 is a pentaerythritol-propylene oxide adduct having an average molecular weight of 400, a hydroxyl number of 560 and an acid number of 0.05. It is available commercially from Wyandotte Chemicals Corporation. While passing nitrogen through the system, the reaction mixture was heated at about 80° for 6½ hours and an additional 300 grams of triethylamine were added. The mixture was heated for an additional 3 hours and then filtered. 23 grams of diatomaceous earth were added to the reaction mass prior to filtration. The filtrate was stripped at 1–8 mm. pressure at 70–80° for about 5 hours. A product was obtained corresponding to the structure:

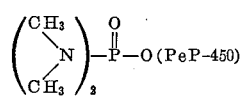

wherein (PeP–450) contains 3 hydroxyl groups and together with attached oxygen is the residue of Pluracol PeP–450 described above.

*Example IV*

To a reaction flask were charged 341 grams of bis(dimethylamido)phosphorochloridate, 21 grams of activated carbon, 270 grams of triethylamine and 675 grams of an adduct of dipentaerythritol and propylene oxide. The latter polyether polyol had a molecular weight of about 675 and a hydroxyl number of 497. The reaction mixture was heated at 79–83° C. for 9 hours. Thereafter, an additional 135 grams of triethylamine were added, and the mixture heated at about 80° for an additional 6 hours. During the reaction period, nitrogen was bubbled through the system. To the mixture was added 10.5 grams of diatomaceous earth, followed by filtration. The filtrate was stripped by heating at 70–80° under vacuum while passing nitrogen therethrough to obtain the desired product.

*Example V*

In this example, a substituted phosphoramidate was prepared from an α-methyl glucoside-propylene oxide adduct having a molecular weight of about 512 and a hydroxyl number of about 439. 1530 grams of the polyol, 512 grams of bis(dimethylamido)phosphorochloridate, 39 grams of activated carbon and 607 grams of triethylamine were charged to a reaction flask. Nitrogen was passed through the mixture which was heated to a temperature of about 75–85° C. for a period of about 14½ hours. After addition of 20 grams of diatomaceous earth, the mixture was filtered through a Buchner funnel having a diatomaceous earth bed. The filtrate was stripped at 80° C., 2 mm. Hg pressure for 4 hours. 1140 grams of the desired product were obtained.

*Example VI*

1060 grams of Pluracol SP Polyol–560, 1024 grams of bis(dimethylamido)phosphorochloridate and 810 grams of triethylamine were charged to a reaction flask. Nitrogen was bubbled through the system and the reaction mass was heated at about 80° C. for a period of about 13 hours when an additional 810 grams of triethylamine was charged. The mixture was heated for an additional 5 hours at 80° and then filtered through a Büchner funnel having a diatomaceous earth bed. The filtrate was stripped by heating at about 80° C., 2–7 mm. Hg pressure for 2½ hours. 826 grams of the desired product having 5 hydroxyl groups was obtained.

*Example VII*

1144 grams of a sucrose-glycerine polyether polyol having a molecular weight of about 572 and a hydroxyl number of 488, 512 grams of bis(dimethylamido)phosphorochloridate, 15 grams of activated carbon and 400 grams of triethyleneamine were charged to a reaction flask. The foregoing polyether polyol was obtained by condensing a 2.5:1 sucrose-glycerine mixture with propylene oxide. Nitrogen was bubbled through the mixture which was heated at 60–75° C. for 3 hours. An additional 227 grams of triethylamine were added and the mixture was heated at 80° for 6 hours. The material was filtered to obtain the desired product.

*Example VIII*

This example illustrates the preparation of a substituted phosphoramidate polyol of this invention by reaction of the potassium alkoxide of a polyether polyol with bis(dimethylamido)phosphorochloridate. 1028 grams of Polyol SP–560 were charged to a reaction flask equipped with a stirrer, thermometer, gas entry means and condensing means. A mixture consisting of 112 grams of potassium hydroxide dissolved in 262 grams of 60% methanol was added to the SP–560 at a temperature of about 50° C. The mixture was then stripped at 125° C. to remove methanol and water and 228 grams of bis(dimethylamido)phosphorochloridate were added. An exotherm was evident, the temperature of the reaction being in the range of 107–147° C. An additional 114 grams of bis(dimethylamido)phosphorochloridate were added to complete the reaction. The solution was a milky white due to the precipitated potassium chloride. The material was then filtered through a diatomaceous earth bed and stripped by heating for 1½ hours at 95–100° C. at 2 mm. Hg pressure. 1042 grams of the desired product were obtained.

*Example IX*

To a reaction flask was added 341 grams of bis(dimethylamido)phosphorochloridate and 270 grams of triethylamine and 680 grams of Pluracol TP–340. This latter material is a trifunctional polyol obtained by condensing trimethylolpropane with propylene oxide in the presence of an alkaline catalyst. The product, having an average molecular weight of 300 and a hydroxyl number of 561 is commercially available from Wyandotte Chemicals Corporation. After about 3½ hours heating at 65–74° C., an additional 135 grams of triethylamine were added to the reaction mass. During the reaction, nitrogen was bubbled through the system. The mixture was then heated at 74–82° for an additional 1¾ hours, cooled and filtered to remove the triethylamine hydrochloride precipitate. The filtrate was heated for an additional 7 hours at 70–80° C., refiltered, and stripped at a temperature under 87° C. 890 grams of an amber-colored liquid having an average of two hydroxyl groups was obtained. The product was soluble in methanol, ethylene dichloride, isopropanol, benzene, toluene, acetone, xylene, Freon 11, trimethylolpropane, toluene diisocyanate, and water, and was insoluble in hexane and petroleum ether. An infrared spectrum provided ample evidence for the structure:

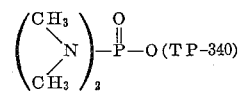

wherein (TP–340) contains two hydroxyl groups and together with attached oxygen is the residue of Pluracol TP–340 polyether described above.

*Example IXa*

This example illustrates the preparation of a polyurethane foam from a phosphoramidate polyol of this invention. A mixture was prepared including 50 grams of the phosphoramidate product of Example IX, 0.2 gram of L–520, 6 grams of Pluracol SP–560 Polyol, 10 grams of N,N,N′,N′-tetrakis(2-hydroxypropyl)ethylenediamine, and 17 grams of Freon 11. L–520 is a silicone surfactant included to improve product homogenity and Freon 11 is a halohydrocarbon blowing agent used to improve the foaming characteristics of the reaction. To the above mixture was added 50 grams of an 80/20 mixture of 2,4/2,6-tolylene diisocyanate to prepare a polyurethane foam. The foam prepared thereby was subjected to ASTM Test D–1692–59T and was found to be non-burning.

*Example X*

To a reaction flask was charged 590 grams of bis(dimethylamido)phosphorochloridate, 520 grams of triethylamine, and 1060 grams of Pluracol Polyol SP–560. The mixture was heated at 70–80° C. for 6 hours and an additional 290 grams of triethylamine were charged. During the reaction, nitrogen was bubbled through the system. After heating for an additional 6 hours at 70–80° C., the mixture was filtered and washed with 500 ml. of ether. The filtrate was stripped by heating at 60–80° for 3 hours under reduced pressure. 1453 grams of a product soluble in Freon 11 was obtained.

*Example Xa*

This example illustrates the preparation of a polyurethane foam by reaction of the phosphoramidate polyol of Example X with tolylene diisocyanate. 100 grams of the phosphoramidate polyol of Example X, 22 grams of Freon 11 and 0.2 gram of L–520 were mixed. 55 grams of an 80/20 mixture of 2,4/2,6-tolylene diisocyanate were added to the foregoing mixture to produce a polyurethane foam. The foam was tested in accordance with ASTM D–1692–59T and was found to be non-burning.

Example XI 3152 grams of a polyol having a hydroxyl number of 249 and prepared by the reaction of trimethyolpropane with a mixture of equal weights of propylene oxide and 1,2-butylene oxide, 238 grams of N-phenyl-N-ethylphosphorodichloridate

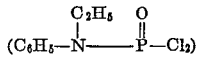

and 210 grams of triethylamine are charged to a reaction flask. Nitrogen is bubbled through the system and the reaction mass is heated at 80–85° C. for about 14 hours, after which time 300 grams additional triethylamine are added.

The mixture is heated for an additional 4 hours and filtered. The filtrate is stripped of volatile components by heating at about 80° C. and 2–10 mm. Hg pressure for 2 hours. The desired product is in the form of a dark colored viscous liquid.

Example XII

In this example, a substituted phosphoramidate is prepared from a sucrose-butylene oxide adduct having a molecular weight of about 825 and a hydroxyl number of 549. 1237 grams of the polyol, 340 grams of bis(diethylamido)phosphorochloridate, 40 grams of activated carbon and 304 grams of triethylamine are charged to a reaction flask. Nitrogen is passed through the mixture which is heated to a temperature of about 80° C. for a period of about 15 hours. The mixture is filtered through a Buchner funnel having a diatomaceous earth pre-coat or bed. The filtrate is stripped at 80° C. and 2–5 mm. Hg pressure for 3 hours leaving a dark, viscous liquid.

Example XIII 1050 grams of a sucrose polyether polyol having a hydroxyl number of 428 is reacted with 130 grams of N-4-chlorophenyl-N-methylphosphorodichloridate

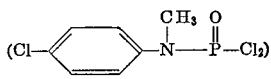

in the presence of 800 grams or tri-n-propylamine. The foregoing polyether polyol was the product of a 75–25 weight percent mixture of propylene oxide and ethylene oxide reacted with sucrose. Nitrogen is bubbled through the mixture which is heated at 100° C. for 3.5 hours. An additional 300 grams of the tri-n-propylamine are added and the mixture heated at 115° C. for 8 hours. The reaction mass is filtered and stripped in the usual manner to obtain the desired product.

Example XIV 1000 grams of a pentaerythritol polyoxypropylene polyether having a hydroxyl number of 56 and a molecular weight of 4000 are reacted with 43 grams of bis(dimethylamido)phosphorochloridate in the presence of 101 grams of triethylamine as an acid acceptor and by the procedure described in Example V. The pentaerythritol polyether used in this preparation is the reaction product of propylene oxide and pentaerythritol.

A series of rigid polyurethane foams was prepared from a polyol mixture comprising a conventional polyether polyol and a phosphoramidate polyol similar to that prepared in Example II, i.e. the reaction product of bis-(dimethylamido)phosphorochloridate with the reaction product of sorbitol and propylene oxide. In Table I, this product is identified as "(SP-560) Bis[tetramethylphosphordiamidate]." The conventional polyether polyol used was Pluracol SP-760 which is a hexafunctional polyol having a molecular weight of about 691 and a hydroxyl number of about 488. It is obtained by reaction of sorbitol with propylene oxide and is available commercially from Wyandotte Chemicals Corporation. The foams were then subjected to ASTM Test D–1692 to determine their flame retardant properties. The formulations of the various foams and the results of the flame retardancy tests are shown in Table 1. The amount of isocyanate used in each blend was varied to maintain a constant NCO/OH ratio of about 1:1.

TABLE 1.—FORMULATIONS AND PHYSICAL PROPERTIES OF RIGID POLYURETHANE FOAMS

| | | | | | | |
|---|---|---|---|---|---|---|
| (SP-560) Bis[tetramethylphosphordiamidate] | 100 | 75 | 50 | 25 | 12 | 0 |
| Pluracol SP-760 Polyol [1] | 0 | 25 | 50 | 75 | 88 | 100 |
| Polymethylene Polyphenyl-Isocyanate | 74.4 | 85.6 | 96.8 | 108.1 | 113.9 | 119.3 |
| Silicone DC-113 [2] | 1.0 | 1.0 | 1.0 | 1.0 | 1.0 | 1.0 |
| 1,2,4-Trimethylpiperazine | 1.5 | 1.5 | 1.5 | 1.5 | 1.5 | 1.5 |
| Catalyst T-12 [3] | 0.5 | 0.5 | 0.5 | +0.5 | 0.5 | 0.5 |
| CCl₃F | 26.6 | 8.3 | 30.0 | 31.7 | 32.5 | 33.3 |
| Density, Lbs./Ft.³ | 2.2 | 2.0 | 2.1 | 2.1 | 2.1 | 2.2 |
| Flammability; ASTM D-1692 | NB | NB | SX | SX | SX | B |
| Time to Extinguish, Sec. | | | 6.5 | 9.5 | 14.0 | |

[1] Sorbitol-propylene oxide adduct, OH number = 488, M.W. = 691. Available from Wyandotte Chemicals Corporation.
[2] Organo-silicone polymer foam control agent supplied by Dow Corning Corporation.
[3] Stannous catalyst.
NB = Non-burning.
SX = Self-extinguishing.
B = Burning.

As evidenced by the above data, polyurethane foams prepared from the phosphoramidate polyols of this invention are non-burning by ASTM Test D–1692. Even diluting the effectiveness of the phosphoramidate by employing a mixture of polyols containing 25% of a conventional polyether polyol resulted in a non-burning foam. Further dilution of the phosphoramidate resulted in self-extinguishing foams, i.e. foams which were self-extinguished after the Bunsen burner flame was removed. Thus, a foam prepared from a polyol mixture containing 12% of the phosphoramidate and 88% of a conventional polyether polyol was self-extinguishing 14 seconds after the burner flame was removed. As shown in the above table, employing 100% of the conventional polyether polyol resulted in a foam that was completely burning according to ASTM Test D–1692.

We claim:

1. A fiire retardant polyurethane resin comprising the reaction product of an organic polyisocyanate and a phosphoramidate containing at least one hydroxyl group represented by the formula:

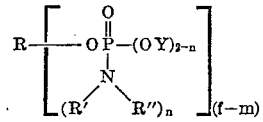

where R, together with attached oxygen, is the residue of a polyol selected from the group consisting of organic polyols containing at least 2 hydroxyl groups per molecule and polyethers of said organic polyols; R' and R'' individually represent a hydrocarbon group selected from alkyl, aryl, cycloalkyl, alkaryl, aralkyl containing up to about 12 carbon atoms and the foregoing hydrocarbons containing halogen substituents; $n$ is a number from 1 to 2; $m$ is a number from 0 to about 7 and is equal to the number of hydroxyl groups present in polyol residue R; $f$ is an integer greater than 1 and is equal to the number of hydroxyl groups originally present in said polyol; and $(f-m)$ is equal to at least 1; Y is selected from the group consisting of R containing $(f-1)$ hydroxyl groups, and

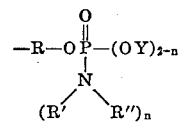

where R, R', R'', Y, $f$ and $n$ have the same significance as stated above.

2. The polyurethane composition of claim 1 wherein R is the residue of a polyether polyol containing from 3 to about 8 hydroxyl groups per molecule and having a molecular weight of from about 200 to 7000, $n$ is equal to 1, $R'$ and $R''$ are the same and are alkyl radicals containing up to about 8 carbon atoms, and Y represents R.

3. The polyurethane composition of claim 1 wherein R is the residue of a polyol selected from the group consisting of polyhydroxyl alkanes containing from 3 to 8 hydroxyl groups, saccharides containing from 5 to 8 hydroxyl groups and mono- and polyethers of the foregoing.

4. The composition of claim 3 wherein said polyether polyol is obtained by condensing a polyol selected from the group consisting of polyhydroxyl alkanes containing from 3 to 8 hydroxyl groups and saccharides containing 5 to 8 hydroxyl groups in the molecule with at least one mol of an alkylene oxide per hydroxyl group of said polyol wherein said alkylene oxide is a vicinal alkylene oxide and contains from 2 to 4 carbon atoms.

5. A fire retardant polyurethane resin comprising the reaction product of an organic diisocyanate and a phosphoramidate represented by the formula:

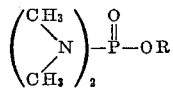

where R contains 2 to 7 hydroxyl groups, and together with attached oxygen is the residue of a polyether polyol obtained by condensing a polyol selected from the group consisting of polyhydroxyl alkanes containing 3 to 8 hydroxyl groups and saccharides containing from 5 to 8 hydroxyl groups per molecule with at least one mol of a vicinal alkylene oxide containing 2 to 4 carbon atoms per hydroxyl group of said polyol.

6. The composition of claim 5 wherein said polyether polyol is obtained by condensing sorbitol and propylene oxide.

7. The composition of claim 5 wherein said polyether polyol is obtained by condensing α-methyl glucoside with propylene oxide.

8. The composition of claim 5 wherein said polyether polyol is obtained by condensing sucrose with propylene oxide.

References Cited by the Examiner

UNITED STATES PATENTS

| | | | |
|---|---|---|---|
| 2,814,636 | 11/1957 | Stahmann | 260—461.306 |
| 2,848,475 | 8/1958 | Schmidt | 260—461.305 |
| 2,866,774 | 12/1958 | Price | 260—77.5 |
| 2,929,800 | 3/1960 | Hill | 260—77.5 |
| 3,014,910 | 12/1961 | Birum | 260—461.303 |

LEON J. BERCOVITZ, *Primary Examiner.*

M. C. JACOBS, *Assistant Examiner.*